(12) United States Patent
Wada

(10) Patent No.: US 8,031,234 B2
(45) Date of Patent: *Oct. 4, 2011

(54) IMAGING APPARATUS AND METHOD FOR DRIVING IMAGING APPARATUS

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 697 days.

This patent is subject to a terminal disclaimer.

(21) Appl. No.: 12/138,245

(22) Filed: Jun. 12, 2008

(65) Prior Publication Data

US 2008/0316326 A1    Dec. 25, 2008

(30) Foreign Application Priority Data

Jun. 13, 2007   (JP) ................................ P2007-156270

(51) Int. Cl.
*H04N 5/228*    (2006.01)
*H04N 5/335*    (2011.01)

(52) U.S. Cl. ..................................... 348/222.1; 348/311

(58) Field of Classification Search ........................ None
See application file for complete search history.

(56) References Cited

U.S. PATENT DOCUMENTS

| | | | |
|---|---|---|---|
| 5,323,233 A * | 6/1994 | Yamagami et al. | 348/277 |
| 6,476,865 B1 * | 11/2002 | Gindele et al. | 348/277 |
| 7,164,497 B2 * | 1/2007 | Itoh | 358/1.9 |
| 7,626,619 B2 * | 12/2009 | Wada | 348/272 |
| 7,839,437 B2 * | 11/2010 | Kasai et al. | 348/273 |
| 2006/0139468 A1 | 6/2006 | Wada | |
| 2006/0192882 A1 * | 8/2006 | Arakawa | 348/333.12 |

FOREIGN PATENT DOCUMENTS

JP    2006-157600 A    6/2006

* cited by examiner

*Primary Examiner* — Luong T Nguyen
(74) *Attorney, Agent, or Firm* — Birch, Stewart, Kolasch & Birch, LLP

(57) ABSTRACT

An imaging apparatus is provided and includes: an imaging device including a first color pixel, a second color pixel, a third color pixel, and the luminance-detecting pixels; a controlling section that generates first complementary color information by adding data of the first color pixel and data of the second color pixel adjacent to the first color pixel, generates second complementary color information by adding data of the second color pixel and data of the third color pixel adjacent to the second color pixel, and generates luminance information by adding respective data of luminance-detecting pixels adjacent to each other, when data of a reduced image having a reduced resolution as compared with a resolution for the whole pixels of the imaging device is generated, and a signal processing section that signal-processes the first complementary color information, the second complementary color information, and the luminance information to reproduce a taken image.

10 Claims, 5 Drawing Sheets

FIG. 3

| R | W | B | W | R |
|---|---|---|---|---|
| W | G | W | G | W |
| B | W | R | W | B |
| W | G | W | G | W |
| R | W | B | W | R |

| R | W | B | W | R |
|---|---|---|---|---|
| W | G | W | G | W |
| B | W | R | W | B |
| W | G | W | G | W |
| R | W | B | W | R |

11

ADDITION PAIR

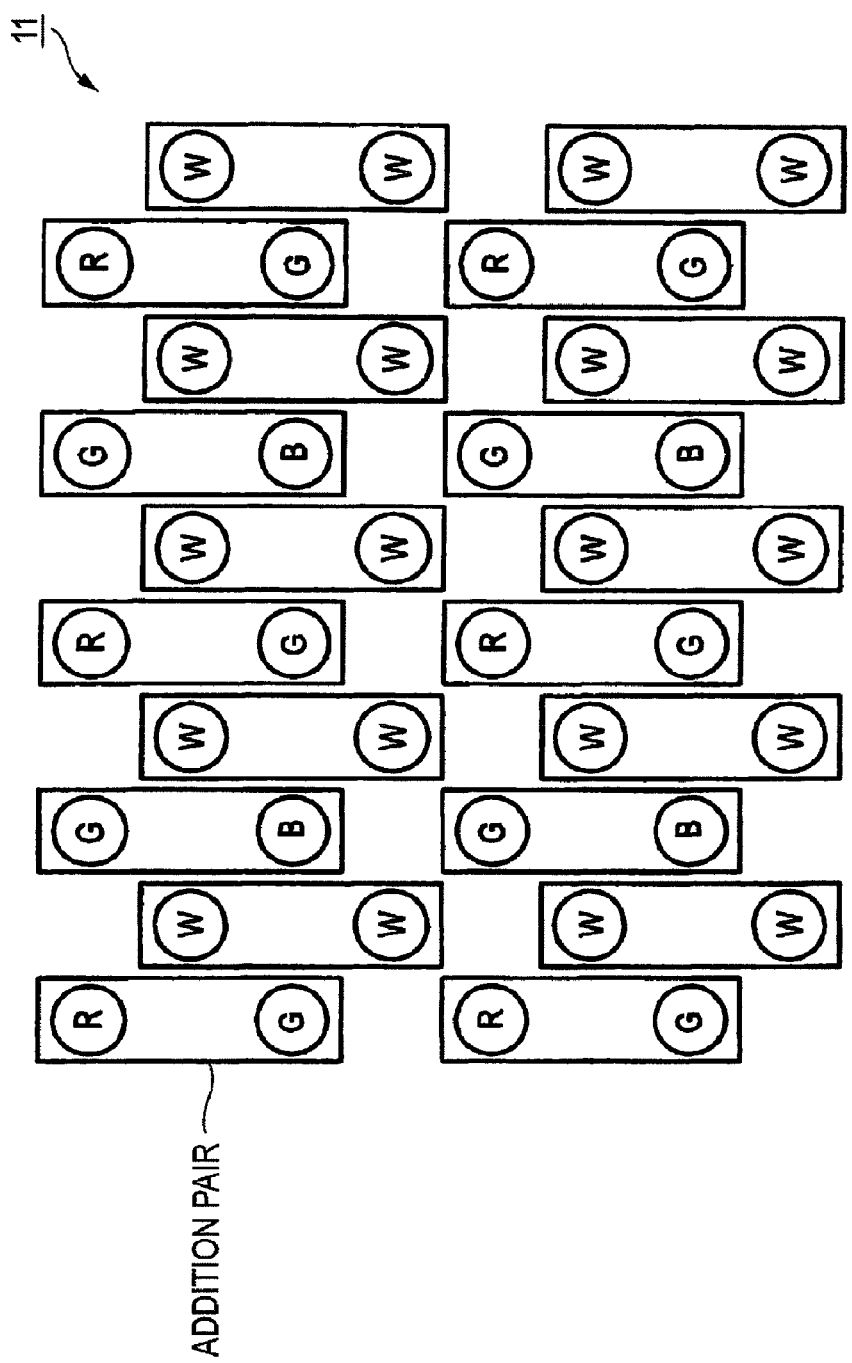

IMAGING APPARATUS AND METHOD FOR DRIVING IMAGING APPARATUS

This application is based on and claims priority under 35 U.S.C. §119 from Japanese Patent Application No. 2007-156270 filed Jun. 13, 2007, the entire disclosure of which is herein incorporated by reference.

BACKGROUND OF THE INVENTION

1. Field of the Invention

The present invention relates to an imaging apparatus and a method for driving the imaging apparatus, in particular, to an imaging apparatus equipped with an imaging device having pixels for detecting colors of each of R (red), G (green), B (blue), and a pixel for detecting luminance of W (white), and to a method for driving the apparatus.

2. Description of Related Art

A solid-state imaging device for photographing color images to be mounted on a digital camera has color filters of, for example, Bayer-arrayed three primary colors of R, G and B. However, if only color filters of R, G and B are used, the luminance resolution of a taken image deteriorates when an object has unbalanced color.

Consequently, conventionally, among respective pixels constituting a solid-state imaging device, checkerwise disposed pixels are used as pixels for detecting luminance, and each of color filters of R, G, B three primary colors is formed on respective pixels at remaining checkerwise disposed positions, so that the luminance resolution of a raken image does not depend on the color of an object.

When a digital camera mounted with a solid-state imaging device for photographing a color image, in which pixels for detecting luminance are formed, is used for photographing, for example, moving images, there is such a case that reduced image data are read out from the solid-state imaging device in order to enhance the frame rate. On this occasion, image data are not read out from pixels for detecting luminance, but image data are read out only from pixels for detecting color having a color filter of R, G or B, thereby making image resolution one-half both longitudinally and horizontally with high accuracy. However, in recent solid-state imaging devices, the high pixelation has reached the technical limit and a signal charge amount that can be received with one pixel is very small. Accordingly, when image data are read out from a solid-state imaging device while performing pixel skipping, the luminance sensitivity becomes low.

In order to solve the problem, JP-A-2006-157600 or US 2006/0139468 A1 realizes to obtain images reduced to one-half without lowering the luminance sensitivity by reading out pixel date without performing the skipping when reading out reduced image data from a solid-state imaging device.

Meanwhile, in the solid-state imaging device as disclosed in JP-A-2006-157600 or US 2006/0139468 A1, a filter Y for detecting luminance or a color filter R, G or B is provided on the surface of individual pixel disposed and formed longitudinally and horizontally. The filter Y is provided on the surface of pixels that are disposed at checked positions, and the color filter R, G or B is provided on the surface of pixels that are disposed at remaining checked positions. On the individual surfaces of pixels in even-numbered lines, filters are so arranged as "Y, G, Y, G, . . . ", and on the individual surfaces of pixels in odd-numbered lines, a line in which filters are so arranged as "R, Y, B, Y, R, . . . " and a line in which filters are so arranged as "B, Y, R, Y, B, . . . " are disposed alternately. Then, when image data taken with the solid-state imaging device are used to generate a reduced image having one-half resolution both longitudinally and horizontally, in this embodiment, image data of two pixels adjacent to each other in the longitudinal direction (vertical direction) are added and read out from the solid-state imaging device. Here, the pair of two pixels in the longitudinal direction is constituted of a Y pixel being a pixel having the filter Y and a pixel having any one of color filters R, G and B, and the pair vertically adjacent to a pair constituted of an R pixel and a Y pixel is a pair constituted of a B pixel and a Y pixel. But, when a reduced image is going to be generated at a ratio smaller than one-half in order to further enhancing the frame rate upon reading out image data, the pixel date must be skipped in the vertical direction. Thus, there is a room for further improvement from the standpoint of satisfying both high readout speed at a high frame rate and high image quality.

SUMMARY OF THE INVENTION

An object of the invention is to provide an imaging apparatus capable of realize high image quality without performing the skipping while reading out image data at a high frame rate, and a method for driving the imaging apparatus.

The above object can be achieved by constitutions below.

(1) An imaging apparatus comprising:
an imaging device including a pixel array of color pixels and luminance-detecting pixels, wherein
the color pixels includes a first color pixel that detects an amount of incident light of a first color among three primary colors, a second color pixel that detect an amount of incident light of a second color among the three primary colors, and a third color pixel that detects an amount of incident light of a third color among the three primary colors,
the luminance-detecting pixels detect luminance information and are arranged adjacent to the respective color pixels, and
the pixel array includes a line in which the first color pixel and the second color pixel are repeatedly arranged, a line in which the second color pixel and the third color pixel are repeatedly arranged, and a line in which only the luminance-detecting pixels are arranged;
a controlling section that generates first complementary color information by adding data of the first color pixel and data of the second color pixel adjacent to the first color pixel, generates second complementary color information by adding data of the second color pixel and data of the third color pixel adjacent to the second color pixel, and generates luminance information by adding respective data of luminance-detecting pixels adjacent to each other, when data of a reduced image having a reduced resolution as compared with a resolution for the whole pixels of the imaging device is generated, and
a signal processing section that signal-processes the first complementary color information, the second complementary color information, and the luminance information to reproduce a taken image.

(2) The imaging apparatus as described in the above (1), wherein the color pixels are arranged in a checkered pattern having a constant pitch in a longitudinal direction and a lateral direction thereof, and the luminance-detecting pixels are arranged in a checkered pattern in which each of the luminance-detecting pixels is deviated by one-half of the constant pitch with respect to the longitudinal direction and the lateral direction of the color pixels.

(3) The imaging apparatus as described in the above (1), wherein the pixel array of the imaging device is a square lattice array of a plurality of pixels, and among the plurality of pixels, pixels disposed at checkerwise positions are the luminance-detecting pixels and pixels disposed at remaining checkerwise positions are the color pixels.

(4) The imaging apparatus as described in any one of the above (1) to (3), wherein the imaging device is a CCD including an addition readout section that performs addition between data of the color pixels and addition between data of the luminance information pixels at a time of reading out data from respective pixels of the imaging device.

(5) The imaging apparatus as described in any one of the above (1) to (3), wherein the imaging device is a CMOS including a data addition section that performs addition between data of the color pixels and addition between data of the luminance information pixels after reading out data from respective pixels of the imaging device.

(6) A method for driving an imaging apparatus that includes an imaging device including a pixel array of color pixels and luminance-detecting pixels, wherein the color pixels includes a first color pixel that detects an amount of incident light of a first color among three primary colors, a second color pixel that detect an amount of incident light of a second color among the three primary colors, and a third color pixel that detects an amount of incident light of a third color among the three primary colors, the luminance-detecting pixels detect luminance information and are arranged adjacent to the respective color pixels, and the pixel array includes a line in which the first color pixel and the second color pixel are repeatedly arranged, a fine in which the second color pixel and the third color pixel are repeatedly arranged, and a line in which only the luminance-detecting pixels are arranged, the method comprising:
generating first complementary color information by adding data of the first color pixel and data of the second color pixel adjacent to the first color pixel, generating second complementary color information by adding data of the second color pixel and data of the third color pixel adjacent to the second color pixel, and generating luminance information by adding respective data of the luminance-detecting pixels adjacent to each other, when data of a reduced image having a reduced resolution as compared with a resolution for the whole pixels of the imaging device is generated, and signal-processing the first complementary color information, the second complementary color information and the luminance information to reproduce a taken image.

(7) The method for driving the imaging apparatus as described in the above (6), wherein the color pixels are arranged in a checkered pattern having a constant pitch in a longitudinal direction and a lateral direction thereof, and the luminance-detecting pixels are arranged in a checkered pattern in which each of the luminance-detecting pixels is deviated by one-half of the constant pitch with respect to the longitudinal direction and the lateral direction of the color pixels.

(8) The method for driving the imaging apparatus as described in the above (6), wherein the pixel array of the imaging device is a square lattice array of a plurality of pixels, and among the plurality of pixels, pixels disposed at checkerwise positions are the luminance-detecting pixels and pixels disposed at remaining checkerwise positions are the color pixels.

(9) The method for driving the imaging apparatus as describe in any one of the above (6) to (8), wherein the imaging device is a CCD, and the method further comprises performing addition between data of the color pixels and addition between data of the luminance information pixels at a time of reading out data from respective pixels of the imaging device.

(10) The method for driving the imaging apparatus as described in any one of the above (6) to (8), wherein the imaging device is a CMOS, and the method further comprises performing addition between data of the color pixels and addition between data of the luminance information pixels after reading out data from respective pixels of the imaging device.

An imaging device according to an aspect of the invention has a pixel array constituted of a line in which a first color pixel and a second color pixel are repeatedly arranged, a line in which the second color pixel and a third color pixel are repeatedly arranged, and a line in which luminance-detecting pixels alone are arranged. In such pixel array, in order to perform readout without the skipping, pairs of data of the first color pixel and data of the second color pixel are read out up to a specific number from the line in which the first color pixel and the second color pixel are repeatedly arranged upon generating first complementary color information. At this time, since the first color pixel and the second color pixel are repeatedly disposed in the same line, the readout can be performed without the skipping. In the same way, pairs of data of the second color pixel and data of the third color pixel can be read out up to a specific number without the skipping from the line in which the second color pixel and the third color pixel are repeatedly arranged upon generating second complementary color information. In addition, since a line constituted of luminance-detecting pixels alone is formed, when reading out data of a pair of the luminance-detecting pixels, it is possible to perform the readout without the skipping. By this means, even if the number of pairs formed by adding data of color pixels and adding data of luminance information pixels increases in order to read out image data at a high frame rate when generating data of a reduced image having reduced resolution as compared with the resolution for the whole pixels of the imaging device, the readout can be performed without the skipping, to make it possible to reproduce not only an image having been reduced to one-half but also a reduced image having an intended reduction ratio.

BRIEF DESCRIPTION OF THE DRAWINGS

The features of the invention will appear more fully upon consideration of the exemplary embodiments of the inventions, which are schematically set forth in the drawings, in which:

FIG. 3 is a surface schematic drawing showing a pixel array of the imaging device;

FIG. 4 is a surface schematic drawing of the imaging device for describing a processing of adding data of pixels and reading out the added data;

FIG. 6 is a surface schematic drawing showing a pixel array of an imaging device according to another exemplary embodiment.

DETAILED DESCRIPTION OF THE
EXEMPLARY EMBODIMENTS

According to an exemplary embodiment of the invention, it is possible to provide an imaging apparatus capable of realizing high image quality without performing the skipping while reading out image data at a high frame rate, and to provide a method for driving the imaging apparatus.

Hereinafter, exemplary embodiments of the present invention will be described in detail on the basis of drawings.

Figure 1:
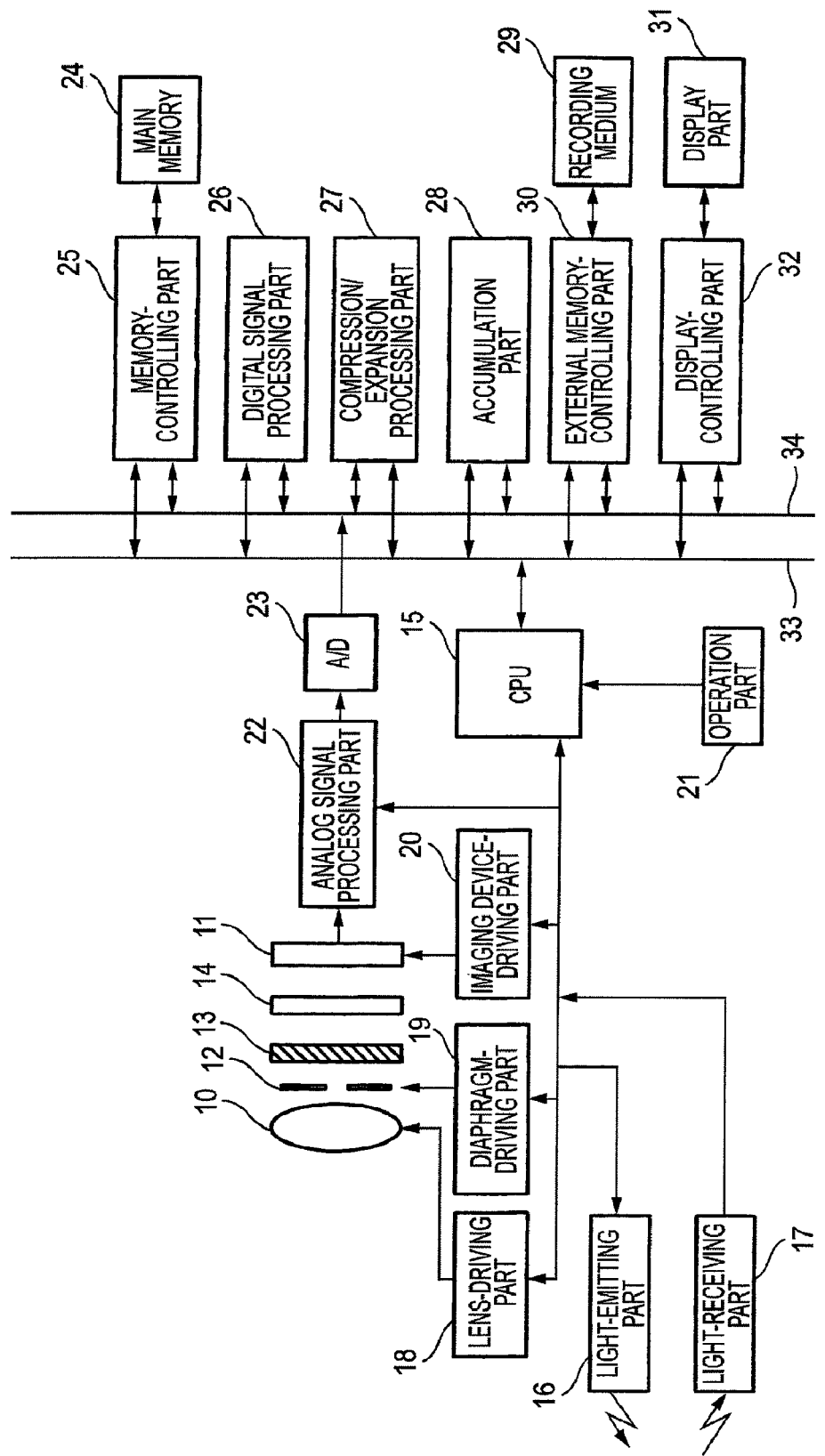
FIG. 1 is a block diagram of an imaging apparatus according to an exemplary embodiment of the present invention.

FIG. 1 is a block diagram of an imaging apparatus according to an exemplary embodiment of the invention. In this embodiment, a digital still camera will be taken as an example for the description, but the invention may be applied to digital cameras of other types such as cameras mounted on small electronic apparatuses such as digital video cameras and cell phones.

The digital still camera as shone in FIG. 1 is equipped with an imaging lens 10, an imaging device 11 of a CCD type, and a diaphragm 12, an infrared ray cut filter 13, and an optical low-pass filter 14 arranged between the imaging lens 1 and imaging device 11. A CPU 15 that controls the whole of the digital still camera controls a light-emitting part 16 and a light-receiving part 17 for a flash lamp, controls a lens-driving part 18 to adjust the position of the photographing lens 10 to the focus position, and controls the aperture of the diaphragm via a diaphragm-driving part 19 to adjust the amount of exposure so as to give correct amount of exposure.

To the imaging device 11, in the embodiment, there are provided a luminance-detecting pixel for detecting a luminance detection signal (W), in addition to a color pixel that detects a signal corresponding to the amount of red (R) incident light, a color pixel that detects a signal corresponding to the amount of green (G) incident light, and a color pixel that detects a signal corresponding to the amount of blue (B) incident light. Meanwhile, the imaging device 11 may be of another system such as a CMOS type instead of a CCD type.

The CPU 15 drives the imaging device 11 via an imaging device-driving part 20 in such a way that is described in detail later to make an object image taken through the imaging lens 10 be output as a color signal. To the CPU 15, an instruction signal of a user is input through an operation part 21 and the CPU 15 performs various types of controls according to the instruction.

The operation part 21 includes a shutter button, wherein the focus is adjusted when the shutter button is in a half-depressed state (switch S1), and an image is taken when the shutter button is in a fully depressed state (switch S2).

The electric control system of digital still cameras is equipped with an analog signal processing part 22 connected to the output of the imaging device 11, and an A/D conversion circuit 23 for converting respective R, G, B color signals and luminance detection signal Y output from the analog signal processing part 22 to digital signals respectively, which are controlled by the CPU 15.

Further, the electric control system of a digital still camera is equipped with a memory-controlling part 25 connected to a main memory (frame memory) 24, a digital signal processing part 26 that performs signal processing, the detail of which will be described later, a compression/expansion processing part 27 that compresses a taken image to a JPEG image and expands a compressed image, an accumulation part 28 that accumulates photometric data to make the gain of white balance be adjusted, an external memory-controlling part 30 to which an attachable/detachable recording medium 29 is connected, and a display-controlling part 32 to which a liquid crystal display part 31 mounted on the backside or the like of a camera is connected, which are connected with each other by a control bus 33 and a data bus 34 and controlled by instruction from the CPU 15.

Figure 2:
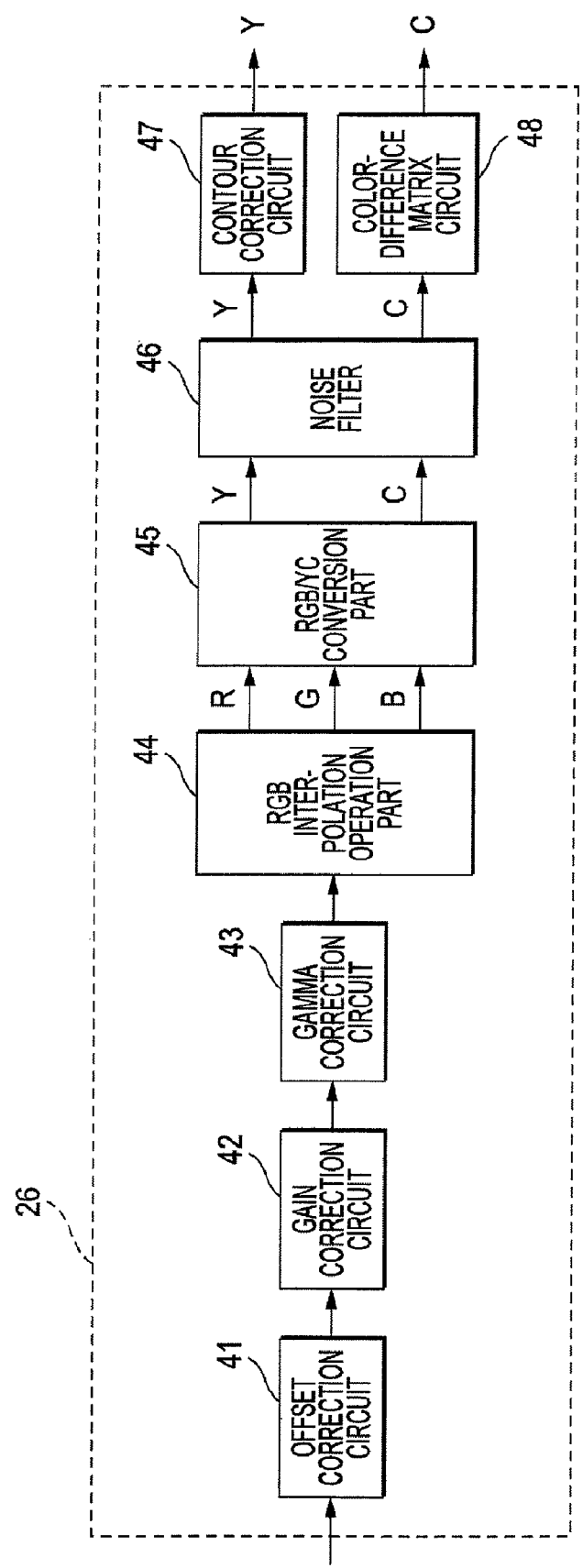
FIG. 2 is a detailed block diagram of a signal processing part.

FIG. 2 is a detailed block diagram of the digital signal processing part 26 as shown in FIG. 1. The digital signal processing part 26 is equipped with an offset correction circuit 41 for importing digital RGB color signals and a luminance detection signal Y output from the A/D conversion circuit 23 to perform offset processing, a gain correction circuit 42 for striking the white balance, and a gamma correction circuit 43 that performs gamma correction for color signals having been subjected to the white balance correction. In the case where linear matrix processing or knee correction is performed for signals having been subjected to the offset correction, it is performed between the gain correction circuit 42 and the gamma correction circuit 43.

The digital signal processing part 26 is further equipped with an RGB interpolation operation part 44 for performing interpolation operation for the RGB color signals having been subjected to the gamma correction to give signals of RGB three colors at respective pixel positions, an RGB/YC conversion part 45 that obtains the luminance signal Y and color-difference signals Cr and Cb from the RGB signals and a luminance detection signal W, a noise filter 46 that reduces noise from the luminance signal Y output from the conversion part 45, a contour correction circuit 47 that performs contour correction for the luminance signal Y after the noise reduction, and a color-difference matrix circuit 48 for performing color tone correction by multiplying color-difference signals Cr, Cb and a color-difference matrix together to perform color tone correction.

The RGB interpolation operation part 44 is unnecessary for an imaging device of a three plate type, but the imaging device 11 used in the embodiment is an imaging device of a single plate type and only a signal of one color among R, G and B or the luminance detection signal Y is output from respective pixels. Therefore, for colors that are not output, that is, in the case of a pixel that outputs R, levels of color signals of G and B at this pixel position is obtained from G and B signals of surrounding pixels by interpolation operation.

FIG. 3 is a surface schematic drawing showing the pixel array of the imaging device 11 used in this embodiment. FIG. 4 is a surface schematic drawing of the imaging device, which describes the processing upon adding and reading out data of pixels. In the solid-state imaging device 11, many pixels are arrayed in a square lattice state, and, among these, a part constituted of 5×5=25 pixels are shown in FIG. 3.

As shown in FIG. 3, in the imaging device 11, filters are so arranged as "W, G, W, G . . . " on each surface of pixels in even-numbered lines, and for odd-numbered lines, a line in which filters are so arranged as "R, W, B, W, R . . . " on each surface of pixels and another line in which filters are so arranged as "B, W, R, W, B . . . " are disposed alternately.

The filter W may be said that it is a filter having spectral properties having correlation with the luminance information, that is, a luminance filter, which covers an ND filter, a transparent filter, a white filter, a gray filter and the like. On this occasion, it is possible to say that a constitution in which no filter is arranged on a pixel surface to allow light to directly enter the pixel surface is also a constitution in which the luminance filter is arranged.

Hereinafter, the description will be continued while denoting a pixel having the filter R as "an R pixel", a pixel having the filter G as "a G pixel", a pixel having the filter B as "a B pixel", and a pixel having the filter W as "a W pixel".

In this embodiment, the imaging device 11 has a pixel array constituted of a line in which the R pixel and the G pixel are repeatedly arranged in an oblique direction, a line in which the G pixel and the B pixel are repeatedly arranged in an oblique direction, and a line in which the W pixels alone are arranged in an oblique direction. Here, "an oblique direction" means the direction in which each of the line constituted of R and B pixels, the line constituted of G and B pixels, and the line constituted of W pixels alone extends, in the state where the vertical direction in FIG. 3 is inclined by 45 degrees in counterclockwise direction. In the imaging device 11, each of R, G and B pixels are formed at the ratio of one relative to two W pixels, in other words, the ratio of the number of R, G, B and W pixels is 1:2:1:4.

When generating, for example, a still image having the maximum resolution while using image data picked up with the imaging device 11 that has the above-described constitution, R, G, B and W image data are separately read out from respective pixels of the imaging device 11 in a conventional manner, which are subjected to image processing in the digital signal processing part 26.

In contrast, when generating a reduced image having low resolution while using image data taken with the imaging device 11, in this embodiment, as shown in FIG. 4 by surrounding with a dotted line, the CPU 15 controls the imaging device-driving part 20 so as to add image data of two pixels adjacent to each other in the oblique direction as an addition pair and to read out the added data from the imaging device 11. When the imaging device 11 is of a CCD type, image data (signal charge amount) may be added on a vertical transfer path, or, when the imaging device 11 is of a CMOS type, the signal amount having been read out by a transistor for reading out signal in accordance with the signal charge amount of respective pixels may be added.

In this embodiment, all the pixels in the oblique direction can be used for the addition upon forming the addition pair, therefore a phenomenon, in which some signal amounts of pixels that are not included in the addition pair are discharged without being read out as in cases of the background art, can be avoided.

Hereinafter, when data of a reduced image having reduced resolution as compared with the resolution for the whole pixels of the imaging device are generated, a means for reproducing a taken image on the basis of data of R, G, B color pixels and data of the W luminance-detecting pixel will be described. Here, the original R signal read out from the imaging device 11 is denoted as "R", the original G signal is denoted as "G", the original B signal is denoted as "B" and the original W signal is denoted as "W".

The addition in the imaging device 11 of FIG. 4 in the oblique direction gives formulae below. In the formulae, Ye represents complementary yellow for the RGB three primary colors, and Cy represents complementary cyan.

$$R+G=Ye$$

$$G+B=Cy$$

$$W+W=2W\approx 2R+2G+2B$$

As shown by above formulae, in the embodiment, the complementary color information is generated from data of two color pixels that are disposed adjacently to each other among data of color pixels of the three primary colors. Specifically, R (data of a first color pixel) and G (data of a second color pixel) adjacent to the R are added to generate Ye (first complementary color information), and G and B (data of a third color pixel) adjacent to the G are added to generate Cy (second complementary color information).

From the above formulae, approximate formulae below can be obtained.

$$W-Ye\approx B$$

$$W-Cy\approx R$$

$$Ye+Cy-W\approx G$$

As the result, RGB can be obtained from general formulae below. Meanwhile, in the formulae below, A(r), A(g) or A(b) represents a constant term that is set for each of RGB.

$$R\approx\alpha(r)W+\beta(r)Ye+\gamma(r)Cy+A(r)$$

$$G\approx\alpha(g)W+\beta(g)Ye+\gamma(g)Cy+A(g)$$

$$B\approx\alpha(b)W+\beta(b)Ye+\gamma(b)Cy+A(b)$$

As described above, R, G and B can be calculated by subjecting W, Ye, Cy, and the constant term A to matrix calculation, wherein the calculated R, G and B are output respectively to the RGB/YC conversion part 45.

In the imaging apparatus of this embodiment, the imaging device 11 has a pixel array constituted of a line in which the R pixel and the G pixel are repeatedly arranged, a line in which the G pixel and the B pixel are repeatedly arranged, and a line in which W pixels alone are arranged, in the oblique direction. Consequently, it is possible to read out the addition pair constituted of data of R and G pixels from the line in which the R pixel and the G pixel are repeatedly arranged up to an intended number, and to generate the complementary color information Ye. On this occasion, since the R pixel and the G pixel are repeatedly arranged in the same line, the readout can be performed without the skipping. In the same way, when generating the complementary color information Cy, it is possible to read out the addition pair constituted of G and B pixels from the line in which the G pixel and the B pixel are repeatedly arranged up to an intended number without performing the skipping. Further, since a line that is constituted of the W pixel alone is formed, data of the W pixel can be read out without performing the skipping when it is read out. Then, from the obtained complementary color information Ye, Cy, and luminance information W, an approximate value of RGB can be obtained. As the result, when reading out image date at a high frame rate as is the case for picking up a moving image, even if the number of pairs for adding data of color pixels and data of a luminance information pixel increases in order to generate data of a reduced image for which the resolution has been reduced as compared with the resolution for the whole pixels of the imaging device, it is possible to perform the readout without the skipping, and to reproduce not only a reduced image of one-half reduction, but also a reduced image of an intended reduction ratio with high image quality.

Figure 5:
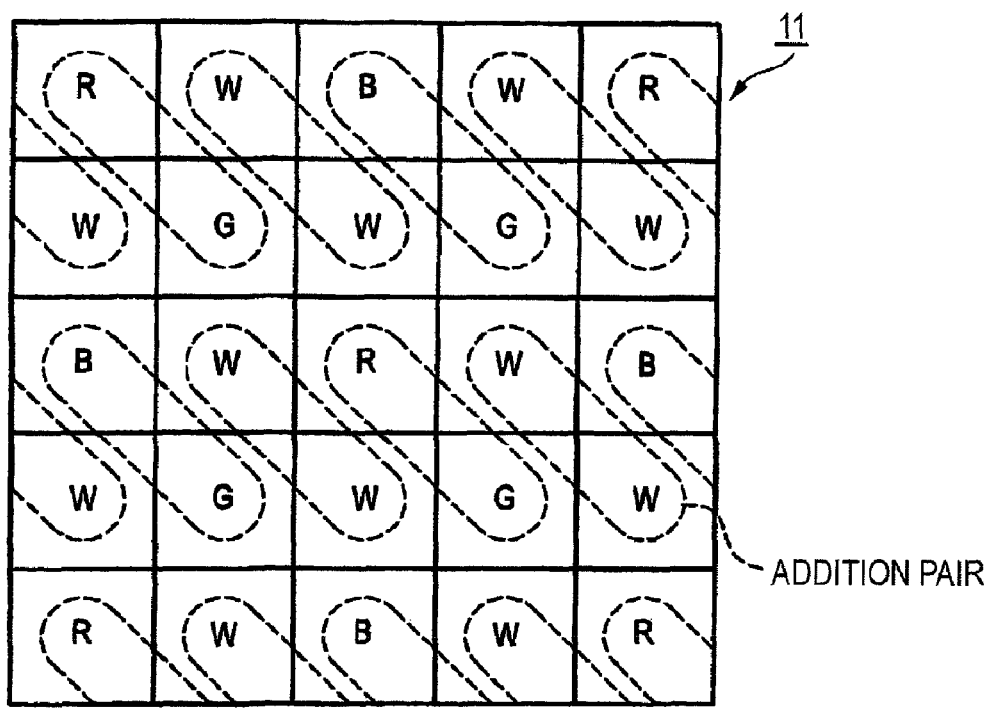
FIG. 5 is a surface schematic drawing showing an example of another addition and readout in the imaging device as shown in FIG. 4.

The pattern of the addition and readout in the pixel array of this embodiment is not limited to one as shown in FIG. 4. For example, as shown in FIG. 5, for a first row in which the R pixel, W pixel, B pixel, W pixel and R pixel are aligned in this order and a second row arranged just under the first row in which the W pixel, G pixel, W pixel, G pixel and W pixel are aligned in this order, date of each of pixels in the first row and data of a pixel positioned at diagonally lower right in the second row may be added as a pair to be read out. When this is done, since the positional relation of a pair to be added relative to the pixel array becomes orderly, the deterioration of an image due to the addition can be suppressed.

Next, another embodiment of the imaging apparatus according to the invention will be shown. Meanwhile, in the embodiment as described below, for members and the like having the equivalent constitution and/or action as those having already been described, the same symbol or corresponding symbol is given in the drawing and the description thereof is simplified or omitted.

FIG. 6 is a surface schematic drawing showing a pixel array of the imaging device 11 according to another embodiment.

As shown in FIG. 6, in the imaging device 11, the R pixel, G pixel and B pixel are checkerwise arrayed in the vertical direction and horizontal direction at the same pitch (so-called Bayer array), and W pixels are checkerwise arrayed at positions deviated by one-half pitch in the longitudinal and lateral directions. W pixels are arrayed at the same pitch as that of color pixels for the longitudinal and lateral directions.

The imaging device 11 has such pixel array that is constituted of a column in which the R pixel (first color pixel) and the G pixel (second color pixel) are repeatedly aligned in the longitudinal direction, a column in which the G pixel and the B pixel (third color pixel) are repeatedly aligned in the longitudinal direction, and a column in which W pixels alone are aligned in the longitudinal direction.

When generating a reduced image having low resolution while using image data picked up with the imaging device 11, in the embodiment, as shown in FIG. 6 by surrounding with a rectangle, the CPU 15 controls the imaging device-driving part 20 so as to add image data of two pixels adjacent to each other in the direction in which the column extends as an addition pair and to read out the added data from the imaging device 11. When the imaging device 11 is of a CCD type, image data (signal charge amount) may be added on a vertical transfer path, or, when the imaging device 11 is of a CMOS type, the signal amount having been read out by a transistor for reading out signal in accordance with the signal charge amount of respective pixels may be added. In this embodiment, all the pixels can be used for the addition upon repeatedly forming the addition pair in the longitudinal direction, therefore a phenomenon, in which some signal amounts of pixels that are not included in the addition pair are discharged without being read out as in cases of the background art, can be avoided.

On this occasion, it is possible to obtain pixel data of RGB by approximation from the complementary color information Ye and Cy, and luminance information W calculated by use of the same calculation formula as in the aforementioned embodiment on the basis of data of RGB color pixels and data of the luminance-detecting pixel.

What is claimed is:

1. An imaging apparatus comprising:
   an imaging device including a pixel array of color pixels and luminance-detecting pixels, wherein
   the color pixels includes a first color pixel that detects an amount of incident light of a first color among three primary colors, a second color pixel that detect an amount of incident light of a second color among the three primary colors, and a third color pixel that detects an amount of incident light of a third color among the three primary colors,
   the luminance-detecting pixels detect luminance information and are arranged adjacent to respective color pixels, and
   the pixel array includes a line in which the first color pixel and the second color pixel are repeatedly arranged, a line in which the second color pixel and the third color pixel are repeatedly arranged, and a line in which only the luminance-detecting pixels are arranged;
   a controlling section that generates first complementary color information by adding data of the first color pixel and data of the second color pixel adjacent to the first color pixel, generates second complementary color information by adding data of the second color pixel and data of the third color pixel adjacent to the second color pixel, and generates luminance information by adding respective data of luminance-detecting pixels adjacent to each other, when data of a reduced image having a reduced resolution as compared with a resolution for the whole pixels of the imaging device is generated, and
   a signal processing section that signal-processes the first complementary color information, the second complementary color information, and the luminance information to reproduce a taken image.

2. The imaging apparatus according to claim 1, wherein the color pixels are arranged in a first checkered pattern having a constant pitch in a longitudinal direction and a lateral direction thereof, and the luminance-detecting pixels are arranged in a second checkered pattern in which each of the luminance-detecting pixels is deviated by one-half of the constant pitch with respect to the longitudinal direction and the lateral direction of the color pixels.

3. The imaging apparatus according to claim 1, wherein the pixel array of the imaging device is a square lattice array of a plurality of pixels, and among the plurality of pixels, pixels disposed at checkerwise positions are the luminance-detecting pixels and pixels disposed at remaining checkerwise positions are the color pixels.

4. The imaging apparatus according to claim 1, wherein the imaging device is a CCD including an addition readout section that performs addition between data of the color pixels and addition between data of the luminance information pixels at a time of reading out data from respective pixels of the imaging device.

5. The imaging apparatus according to claim 1 wherein the imaging device is a CMOS including a data addition section that performs addition between data of the color pixels and addition between data of the luminance information pixels after reading out data from respective pixels of the imaging device.

6. A method for driving an imaging apparatus that includes an imaging device including a pixel array of color pixels and luminance-detecting pixels, wherein
   the color pixels includes a first color pixel that detects an amount of incident light of a first color among three primary colors, a second color pixel that detect an amount of incident light of a second color among the three primary colors, and a third color pixel that detects an amount of incident light of a third color among the three primary colors,
   the luminance-detecting pixels detect luminance information and are arranged adjacent to respective color pixels, and
   the pixel array includes a line in which the first color pixel and the second color pixel are repeatedly arranged, a line in which the second color pixel and the third color pixel are repeatedly arranged, and a line in which only the luminance-detecting pixels are arranged,
   the method comprising:
   generating first complementary color information by adding data of the first color pixel and data of the second color pixel adjacent to the first color pixel, generating second complementary color information by adding data of the second color pixel and data of the third color pixel adjacent to the second color pixel, and generating luminance information by adding respective data of the luminance-detecting pixels adjacent to each other, when data of a reduced image having a reduced resolution as compared with a resolution for the whole pixels of the imaging device is generated, and
   signal-processing the first complementary color information, the second complementary color information and the luminance information to reproduce a taken image.

7. The method for driving the imaging apparatus according to claim 6, wherein the color pixels are arranged in a first checkered pattern having a constant pitch in a longitudinal direction and a lateral direction thereof, and the luminance-detecting pixels are arranged in a second checkered pattern in which each of the luminance-detecting pixels is deviated by one-half of the constant pitch with respect to the longitudinal direction and the lateral direction of the color pixels.

8. The method for driving the imaging apparatus according to claim 6, wherein the pixel array of the imaging device is a square lattice array of a plurality of pixels, and among the plurality of pixels, pixels disposed at checkerwise positions are the luminance-detecting pixels and pixels disposed at remaining checkerwise positions are the color pixels.

9. The method for driving the imaging apparatus according to claim 6, wherein the imaging device is a CCD, and the method further comprises performing addition between data of the color pixels and addition between data of the luminance information pixels at a time of reading out data from respective pixels of the imaging device.

10. The method for driving, the imaging apparatus according to claim 6, wherein the imaging device is a CMOS, and the method further comprises performing addition between data of the color pixels and addition between data of the luminance information pixels after reading out data from respective pixels of the imaging device.

* * * * *